Oct. 12, 1954  W. LÖBBE  2,691,514
PLANER TYPE COAL MINING AND LOADING MACHINE
Filed May 27, 1948  3 Sheets-Sheet 1

INVENTOR
WILHELM LÖBBE
BY Ralph Dinklage
ATTORNEY

Oct. 12, 1954   W. LÖBBE   2,691,514
PLANER TYPE COAL MINING AND LOADING MACHINE
Filed May 27, 1948   3 Sheets-Sheet 2

INVENTOR
WILHELM LÖBBE
BY Ralph Dinklage
ATTORNEY

Oct. 12, 1954      W. LÖBBE      2,691,514

PLANER TYPE COAL MINING AND LOADING MACHINE

Filed May 27, 1948      3 Sheets-Sheet 3

INVENTOR
WILHELM LÖBBE
BY Ralph Dinklage
ATTORNEY

Patented Oct. 12, 1954

2,691,514

UNITED STATES PATENT OFFICE 2,691,514

PLANER TYPE COAL MINING AND LOADING MACHINE

Wilhelm Löbbe, Oberaden, Germany, assignor to Gewerkschaft Eisenhutte Westfalia, Lunen, Germany, a firm Application May 27, 1948, Serial No. 29,483

Claims priority, application France June 14, 1947

13 Claims. (Cl. 262—32)

This invention relates to a coal mining and loading machine and more particularly to a coal planer and loader which in the following description is generically designated a planer and comprises a conveyor having a substantially stationary trough and preferably endlessly movable conveying scrapers. The planer having two cutting tools and being guided at the conveyor detaches a cutting of coal from the coal face on its travel and return along the conveyor. The conveyor being arranged along the coal face transfers the detached coal always in the same direction. Another feature of the invention consists in that the detached coal is transferred by the planer into the conveyor trough.

Still another feature of the invention consists in that at that side of the conveyor which faces the coal edge there is provided a ramp the inclined plane of which reaches to the top edge of the conveyor over which edge the detached coal is pushed into the conveyor.

Another feature of the invention is that the ramp bolted to the side of the conveyor is overlapped by the blades adjacent to the cutting tools of the planer.

Another feature of the invention is that the planer is guided by means of a guide beam arranged in an uncovered channel of the ramp.

The ends of the guide beam are a little thinner than the middle so that the planer under the stress of cutting is brought into an inclined position.

An additional feature of the invention is that the ramp secured to the conveyor is so designed that the coal pieces being pushed over the ramp can glide freely and unobstructively over the guide channel.

According to another feature of the invention the ramp ends somewhat below the side profie of the trough in a horizontal stage which is so designed that if projected the upper part of the ramp would not intersect the side profile of the trough. The coal gliding upwards on the ramp is therefore not dammed up and impeded in front of the side profile of the trough. This design allows the two side profiles of the trough to be used as guide-rails for a coal-cutter which is moved along the coal face in order to mortise the coal bed, and prevents the coal cutter from impeding the planer on its travel and return and from impeding the flight scraper conveyor.

An essential feature of the invention consists in that the conveyor and the planer are provided with a common driving mechanism.

If there are provided two driving stations, one at each end of the conveyor, by which the scraper flight conveyor is operated the planer can alternately be connected with the one or the other driving station. The two driving stations are in this case coupled one with another by means of the scraper flight of the conveyor.

Another feature of the invention consists in that both driving stations have a shifting coupling by means of which the planer is alternately coupled with the one or the other of the two driving stations and correspondingly dragged in one or other direction.

Further features of the invention will be apparent from the following description read in conjunction with the drawings in which.

Figure 3:
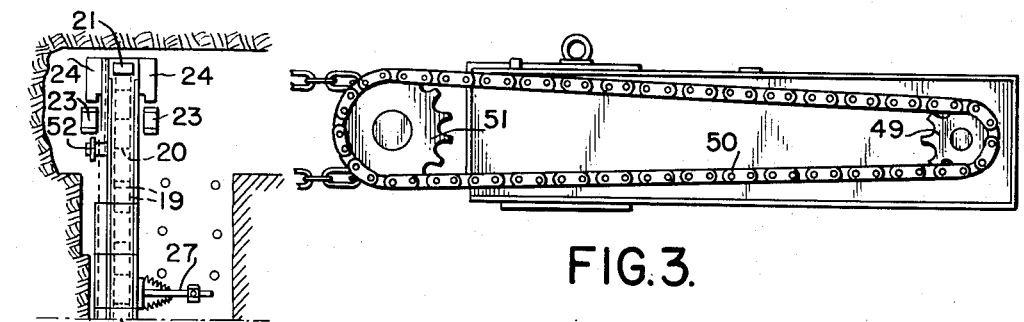
Fig. 3 is a cross section according to line 3—3 of Fig. 2.
Figure 2:
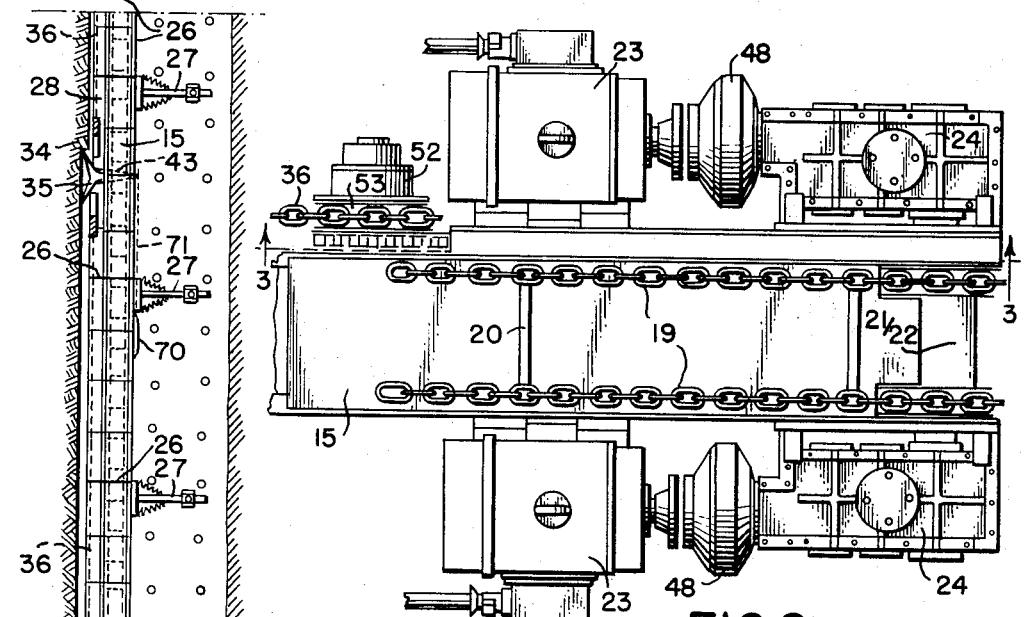
Fig. 2 is a view of a driving station on an enlarged scale.
Figure 1:
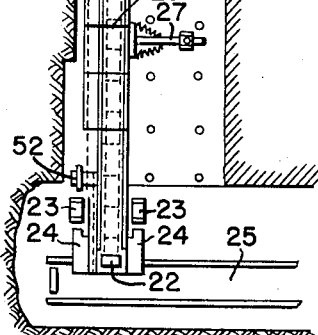
Fig. 1 is a plan view of the planer and the conveyor.
Figure 5:
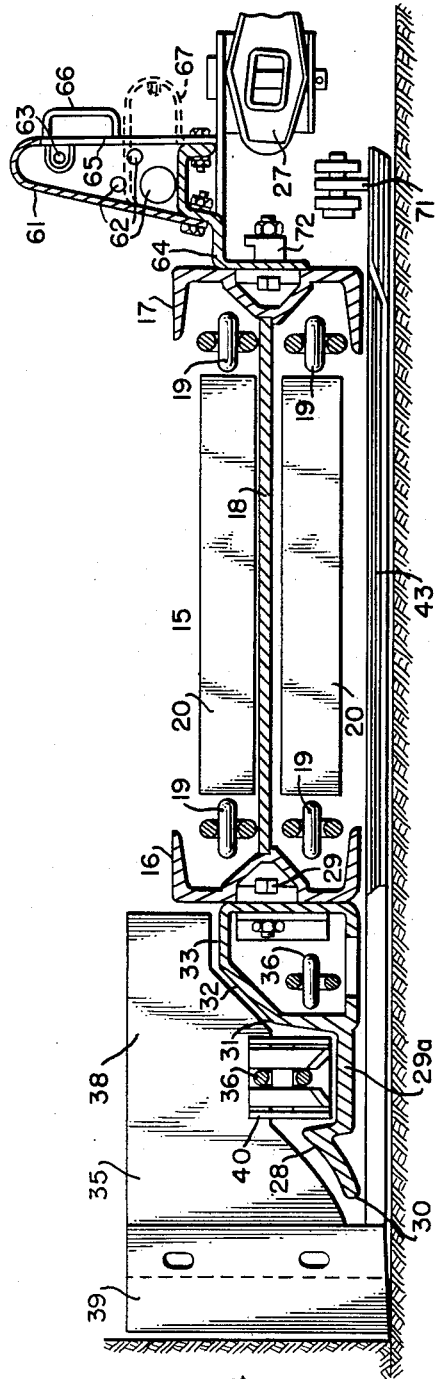
Fig. 5 is a cross section of the conveyor on an enlarged scale.

According to Figs. 1 and 5 of the drawing the conveyor has the reference numeral 15. It consists of the two side sectional irons 16 and 17 Fig. 5 which are connected by the conveyor bottom 18. Endless transport scrapers comprising the chains 19 and scrapers 20 are arranged in the conveyor 15. As may be seen from Figs. 1–3 of the drawing two driving stations are provided one at each end of the conveyor, each station being provided with motors 23 connected with gear units 24. The endless chains 19 travel above the conveyor bottom 18 to the drive pulley of the driving station 21 and return under the conveyor bottom 18 to the drive pulley of the second driving station 22. The coal loaded into the conveyor trough 16—18 is always transferred by the scrapers 20 in the same direction and finally is deposited into the conveyor 25 for removal.

The conveyor trough 15 consists of a number of sections which are in principle rigidly connected one with another but allow a certain lateral shifting to take place at the joints indicated by thicker cross lines in Fig. 1 of the drawing. Jacks for shifting the conveyor laterally are provided at these joints and are schematically shown being indicated by numerals 27. These jacks may be of any desired type, one suitable construction thereof being for instance described and claimed in my co-filed application, Serial Number 29,484.

According to Figs. 1, 5, 6, 9 and 10 of the drawing a ramp or apron 28 is laterally arranged at the conveyor. The ramp is detachably connected with the conveyor 15 by means of bolts 29. The ramp is likewise made of separate sections having the same length as the sections of the conveying trough 16—18.

At about half the height of the ramp or apron 28 an open guide channel or recess 29a is provided. The nose or lower edge 30 of the apron below the channel or recess normally rests on the floor of the coal seam. The inclined extension 31 of the ramp or apron surface situated above the channel or recess 29 is preferably not in alignment with the surface of the lower part 30 but is slightly set back therefrom. This is to insure that the coal gliding upwards over the ramp is not stopped by the channel but is more easily transferred across the channel. Shortly before the lateral sectional iron 16 of the conveyor 15 the upper inclined part 31 of the ramp turns into a horizontal plane 32. The upper part 31 of the ramp 28 is so inclined that an extension of the plane of its surface would not intersect the lateral sectional iron 16 of the conveyor 15 but would pass over it. The coal rolling upwards on the part 31 of the ramp therefore moves in a direction so that it does not dam up in front of the lateral sectional iron 16 of the conveyor but is passed over this lateral sectional iron 16 into the conveyor. A thin layer of small pieces of coal forms and the larger pieces roll above the layer into the conveyor.

The coal is detached from the coal face 34 by means of the planer having two opposite cutting tools one of them being fed across the coal face on the travel the other on the return of the planer. The planer is moved by means of an endless drag chain 36, a rope, or the like, which, running along the coal face 34, is hauled by one of the two driving stations 21 and 22. The drag chain returns under the ramp 28. As may be particularly seen from Figs. 5 and 6 of the drawing the planer consists chiefly of a ploughshare shaped middle part 37 being limited on its front and back sides by inclined gliding planes 38 which terminate in opposite directed cutting tools 39. The planer is firmly connected with a longitudinal beam 40 which is guided in the channel 29 of the ramp 28. Being tapered towards its ends 41 the beam 40 can take a diagonal position in the channel 29 so that that cutting tool which is fed across the coal face is always more distant from the conveyor than the backwards turned cutting tool so that there is no friction between the flank 42 of the planer 35 and the coal face 34. The endless drag chain or drag rope 36 is attached to the free ends 41 of the guide beam 40; and travels in the channel 29 along the whole length of the working place and returns under the ramp 28 so that it will not cause any danger to the miners.

The planer 35 is guided by the beam 40 in such a manner that it cannot move laterally away from the conveyor 15. In order to prevent a vertical movement the planer 35 is provided with a broad and flat base plate 43 which glides under the conveyor 15 and the ramp 28. As the conveyor 15 with the coal contained in it rests on the base plate the planer 35 cannot lift up itself.

Figure 6:
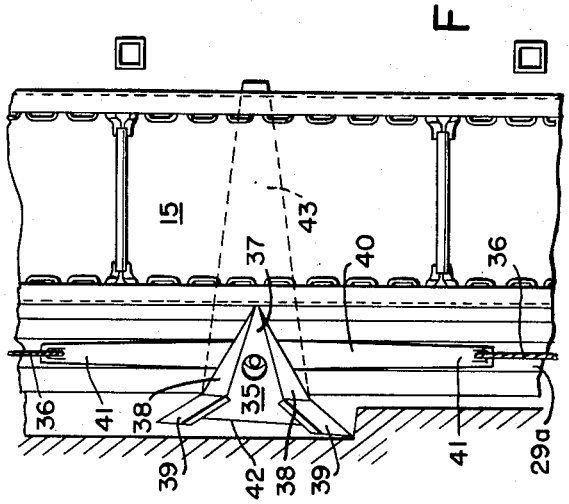
Fig. 6 is a top view of the guide-arrangement for the planer.

The particular cutting head of the planer shown in Fig. 6 is one limitedly pivotable around a pivot post to thereby cause the cutting edge facing the direction of movement to be tilted into coal cutting position while lifting the other cutting edge away from the coal face. This pivot construction is described in greater detail and claimed in the co-filed application, Serial Number 29,432, of Julius Hermann and is merely shown in this case by way of illustrating the novel guide bar in accordance with my invention in its application to the Hermann pivotable cutting head construction.

Figure 7:
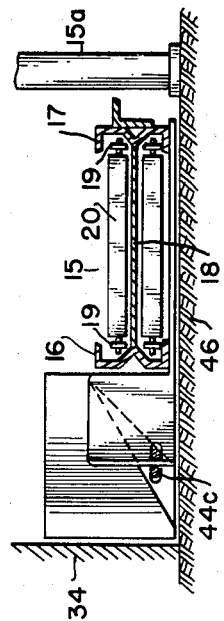
Fig. 7 and Fig. 8 are a top view and cross section of another design of the guide-arrangement.
Figure 8:
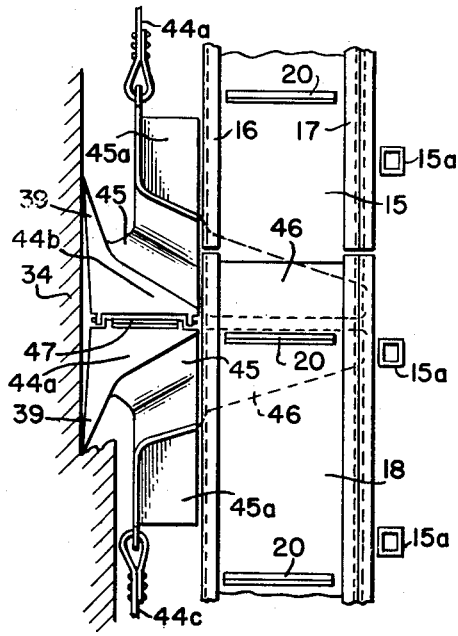

In accordance with Figs. 7 and 8 of the drawings no ramp or apron is provided at the side of the conveyor 15 facing the coal seam to be cut. The conveyor 15 comprising the essentially U-shaped opposing sections 16 and 17 and the connecting scraper bottom 18 is in substantially fixed or anchored position against movement away from the coal face such as by suitable jacks or stakes driven into the floor. Planer 44 is then directly guided by and along the lateral sectional piece 16 which defines as such a longitudinal guide surface, the planer being held in guided relation thereto by its wedging action between the anchored conveyor and the coal face seam. It is thus the anchored conveyor as such which prevents the planer 44 to push itself out of cutting position with respect to the coal face 34. The coal which is broken loose from the face of the seam as the cutting head moves along the conveyor is pushed upwardly and over the top of section member 16 into the conveyor proper 15 by means of the angled guide blades 45 adjacent the cutting edges 39 of planer 44. The cut coal tumbling over the top of section member 16 into the conveyor is continuously transported therein by way of the scraper cross bars 20 attached to and carried by the endlessly moving transport chains 19. The endless conveying scraper composed of the chain and cross bars passes underneath the stationary bottom 18 for return into the trough for coal transport therein.

The planer in the construction shown in Fig. 8 consists of the two planer portions 44a and 44b, which are held together by the substantially horizontally arranged link bolt 47 positioned to substantially extend in a direction normal to the coal face 34. Cutting directional movement of the planer is accomplished by way of the rope 44c. Each of the members 45a forms itself an inclining apron or ramp serving to scoop up accumulated coal that may have spilled into the space between the coal face and the conveyor. This scooped-up coal is then also transported up the incline 45 for conveyance into the trough 15. The joint or link bolt 47 permits the planer to travel without difficulty over depressions and ridges in the seam floor. Supports or props 15a may serve if desired as suitable anchoring means such as for jack members or conventional wedges, the latter being selected of increasing thickness with each passage of the coal planer to move the conveyor towards the seam face a distance commensurate with the thickness of the coal which has been cut by the planer.

Figure 4:
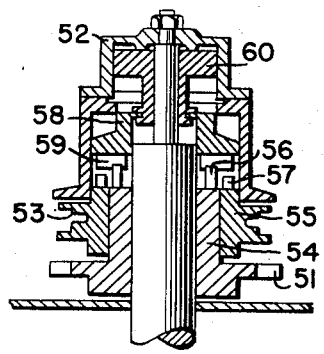
Fig. 4 is a cross section of a coupling shown in Fig. 2.

The scraper flight conveyor 19/20 and the planer 35 are driven by means of the drive stations 21 and 22 provided at the upper and lower end of the conveyor 15. In order to protect the motor 23 there are arranged between the motors and the gear units 24 couplings 48 which are preferably hydraulic couplings. A shaft 49 (Fig. 3) drives a sprocket 51 by means of chain drive 50; the sprocket 51 is connected with the drive pulley 53 by means of the coupling 52. The pulley 53 drives the chain 36 which drags the planer 35. As may be seen from Fig. 4 of the drawing the pulley 53 and the sprocket 51 have on their parts 55 and 54 lateral bearing surfaces and tooth-like claw clutches 56 and 57. The coupling is effected by a lateral shifting of the pulley 58 which is provided with lateral teeth 59. The shifting of the pulley 58 is carried out by means of the piston 60; compressed air or some other compressed medium can alternately be admitted to both sides of the piston.

According to Fig. 1 of the drawing the scraper flight conveyor 19, 20 is driven in such a manner that the coal is always conveyed from the driving station 21 to the driving station 22, into the conveyor 25 of the lower drift. The planer 35 is as shown moving in the opposite direction. The coupling 52 of the driving station 21 is shifted whereas the coupling 52 of the station 22 is disengaged. When the planer 35 has reached the upper end of the travel the coupling 52 of the driving station 21 is disengaged and the coupling 52 of the driving station 22 is shifted. The conveyor 15 is shifted towards the coal face 34 and then the planer 35 returns along the coal face.

Great advantages are obtained by using a common drive for the planer 35 and the conveyor 15. As both the driving stations 21 and 22 are operating their size can be relatively small which is of great importance for coal mines. If the conveyor is overcharged the planer 35 can be put out of operation. The scraper flight conveyor removes the coal so that the coal planer can be connected again after a short time. When the coal planer meets an increased resistance for some reason or other the planer is disconnected till the conveyor 15 is more or less empty so that it needs but little energy and then the whole energy of the two driving stations 21 and 22 can almost entirely be used for operating the planer. The two driving stations are permanently connected in parallel by the revolving scraper flight conveyor 19, 20 so that in any case their efficiencies add themselves; it does not matter whether the conveyor 15 is overloaded or whether the planer shall for a short time be hauled by employing all the energy available.

When the conveyor is overloaded the danger arises that the coal pushed by the planer into the conveyor falls down from the other side of the conveyor. In order to avoid this danger a high wall 61 (Fig. 5) is arranged behind the lateral section 17. The high wall preferably consists of acute angled sheet sections forming a protective casing for electric cables 62, hoses and a signal line 63 by means of which information can be transmitted. The protective casing 61 is mounted on angular supports 64 which are on their part connected with the lateral section 17 of the conveyor. In the back of the protection casing 61 there are provided holes 65 by which the cables 62, hoses, signal line 63 and the like are accessible. There are, furthermore, provided on the back of the protective casing 61 connection collars, plug boxes and the like. Should the wall 61 be too high with regard to the coal face it can be, as indicated by dotted lines at 67, lie flat. In this case, too, the loading capacity of the conveyor trough 15 is increased.

As is apparent from the drawings and particularly page 5 thereof the device in accordance with the invention is characterized by an open trough and an unrestricted open top construction. This has the advantage that even large pieces of coal, relatively large rocks, occasional pieces of timbering, etc., can be passed into the conveyor and transported by the same. Furthermore, inasmuch as side profile sections 16 and 17 of the conveyor trough 15 have entirely free and unobstructed upper ends, it is possible to use these profile sections as for instance illustrated in Figs. 9 and 10 by way of guide tracks for independently moving thereon an independently operative piece of coal mining machinery such as line or groove cutter 68 having groove cutter arm 69 for cutting a substantially horizontal groove into the coal face to thereby facilitate the planing or breaking loose of the seam face below the cut. Line or groove cutter 68 may be independently moved back and forth over the tracks defined by the upper end of the trough sections 16 and 17 and regardless of the movement or position of the cutting head of the planer.

Figure 9:
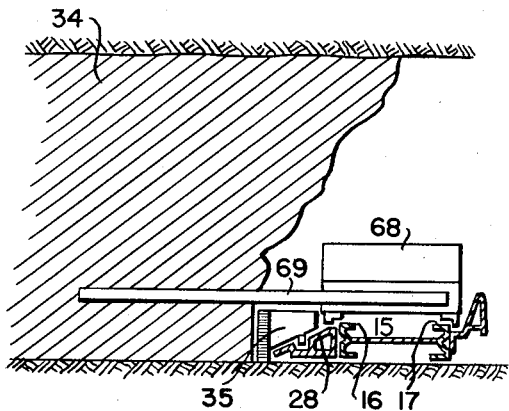
Fig. 9 and Fig. 10 show the guide of the coal cutter on the side profiles of the conveyor.
Figure 10:
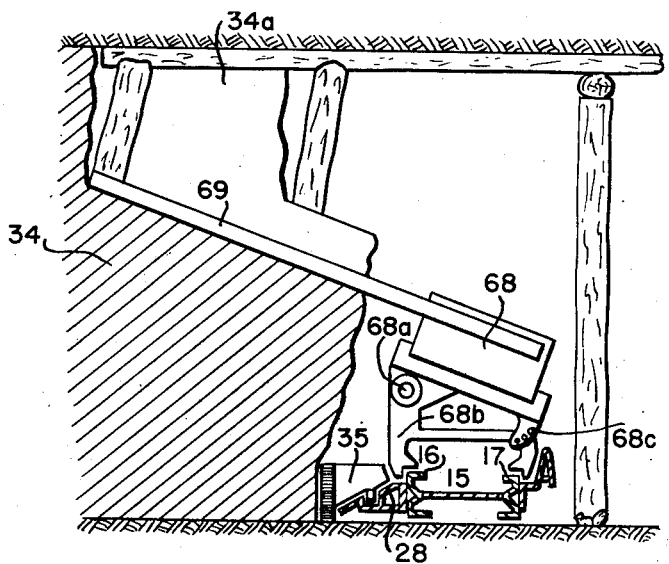

The illustration of Fig. 10 is substantially similar to that shown in Fig. 9. In this case, however, the line or groove cutter is not supported directly as such on the upper end of the side sections 16, 17 of trough 15 but is connected by way of the pivot member 68a secured to the frame 68b which in turn rests upon the sections 16, 17. Pivot member 68a permits the pivoting of the line or groove cutter 68 to any desired upwardly extending angle of the cutter bar 69. The specific illustration of Fig. 10 shows the cutter bar 69 to have cut upwardly into the seam whereby the upper seam portion 34a has separated itself and has tumbled into the conveyor 15. The line or groove cutter is secured at 68c through a suitable bolt or the like to maintain the desired cutting angle.

The conveyor 15 may be automatically shifted towards the coal face after each passage of the planer. This operation may be carried out by means of a wedge shaped slide (not shown) which is attached to the base plate 43 or 46 of the planer 35 by means of a chain 71. The wedge glides along a guide rail 72 and wedges itself between the rail 72 and the top head of the jack head 27. As the jack 27 is anchored and cannot move backward the rail 72 and together with the rail the conveyor 15 and the ramp 28 are shifted towards the coal face 34. On the next passage of the wedge the conveyor 15 is not shifted but the jack head is moved towards the conveyor being thus again brought into wedging position. Upon the next passage of the wedge following the passage of the cutting head the conveyor is once more shifted against the coal face. Details of conveyor shifting arrangements and of the preferred automatic shifting of a conveyor are described in detail and covered as above mentioned in my co-filed application Serial Number 29,484.

What I claim is:

1. Improvement in mining equipment which comprises a substantially longitudinally extending conveyor, guide means extending lengthwise along the forward longitudinal portion of said conveyor, a base member movable back and forth along said guide means in guided relation thereto, said base member being dimensioned and positioned relative to the guide means to permit a limited pivoting with respect thereto in substantially the horizontal plane, and a planer cutting head attached to said base member and movable therewith.

2. Improvement according to claim 1 including means for guiding cut material from said planer cutting head on to said conveyor when moving said planer cutting head in contact with a mine face.

3. Improvement according to claim 2 in which said conveyor is provided with a substantially stationary trough and endlessly movable scraper conveying means positioned partly within said trough for coal conveying action therein, and in which said means for guiding cut material is positioned and arranged to guide material from said planer cutting head into said trough.

4. Improvement in coal mining equipment which comprises a substantially longitudinally extending coal conveyor, an inclined apron alongside said conveyor, means defining a substantially longitudinal recess in the apron surface substantially parallel to said conveyor, a bar member within said recess slidably movable in either direction therein and tapering at both ends to give sufficient play with the side walls of said recess to permit limited pivoting of said bar member, means for moving said bar member in at least one direction in said recess, and a coal planer cutting head secured to said bar member.

5. Improvement according to claim 4 in which said coal planer cutting head has cutting means for cutting in either direction of movement along said recess and in which said means for moving said bar member is means for moving the same in either said direction.

6. Improvement according to claim 4 in which said recess has substantially vertical sides.

7. Improvement according to claim 4 in which there is additionally included means for securing said coal planer cutting head against appreciable vertical movement.

8. Improvement according to claim 7 in which said means for securing said coal planer cutting head against appreciable vertical movement comprises a base plate member mounted movable with said coal planer cutting head in a substantial alignment therewith and extending substantially beneath the width of said apron and conveyor.

9. Improvement according to claim 4 in which the angle of inclination of the surface of the portion of the inclined apron below said recess is less than the angle of inclination of the surface of the portion of said inclined apron above said recess.

10. Improvement according to claim 9 in which the angle of inclination of the portion of the apron below the recess is such that the plane defined by that surface extends above the lower edge of the portion of the inclined apron above the recess.

11. Improvement according to claim 10 in which there is additionally provided a horizontal section extending from substantially the upper edge of the portion of the apron above said recess and substantially abutting the conveyor below the upper edge thereof.

12. Improvement according to claim 11 in which the angle of inclination of the portion of the inclined apron above said recess is such that the plane defined thereby extends above the nearest conveyor edge.

13. Improvement according to claim 4 in which means are provided adjacent the upper edge of said conveyor away from said coal planer cutting head substantially defining a cable casing being positioned and arranged to act as a back wall for said conveyor.

References Cited in the file of this patent

UNITED STATES PATENTS

| Number | Name | Date |
| --- | --- | --- |
| 1,201,537 | Wissemann | Oct. 17, 1916 |
| 1,563,153 | Brackett et al. | Nov. 24, 1925 |
| 1,710,801 | Morgan | Apr. 30, 1929 |
| 2,085,756 | Joy | July 6, 1937 |

FOREIGN PATENTS

| Number | Country | Date |
| --- | --- | --- |
| 642,686 | Germany | Mar. 12, 1937 |

OTHER REFERENCES

Bureau of Mines Information Circular #7377; Design and Operation of the Coal Planer, Ruhr District, Germany, by J. W. Buck, published October 1946, Figs. 17 and 19a.